April 21, 1970
W. T. EPPLER
3,508,147
CAPACITANCE BRIDGE HAVING A REFERENCE CAPACITOR MADE
FROM THE SAME MATERIAL UNDER TEST
Filed June 11, 1968
3 Sheets-Sheet 1
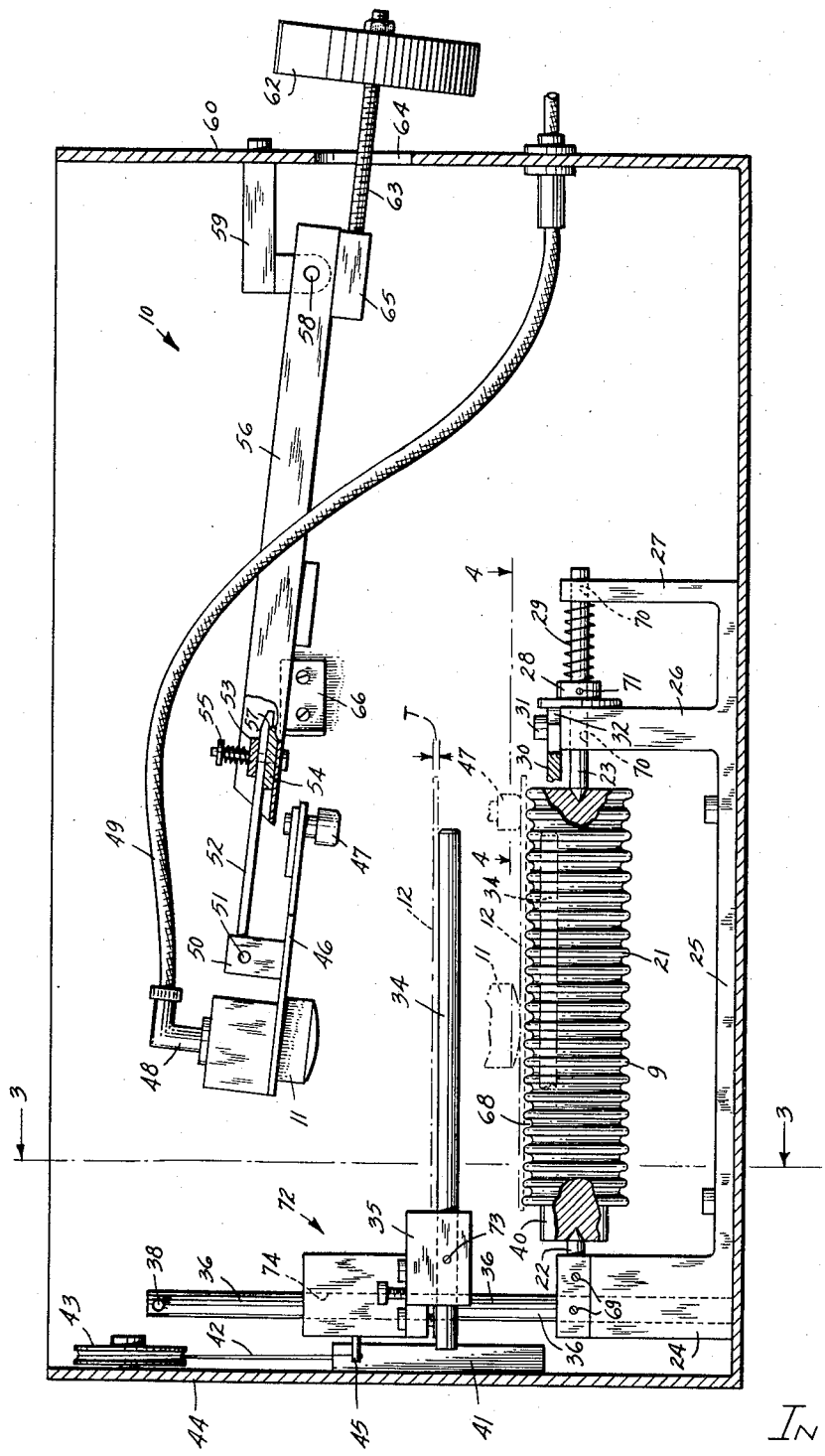
FIG. 1
INVENTOR
W. T. EPPLER
ATTORNEY

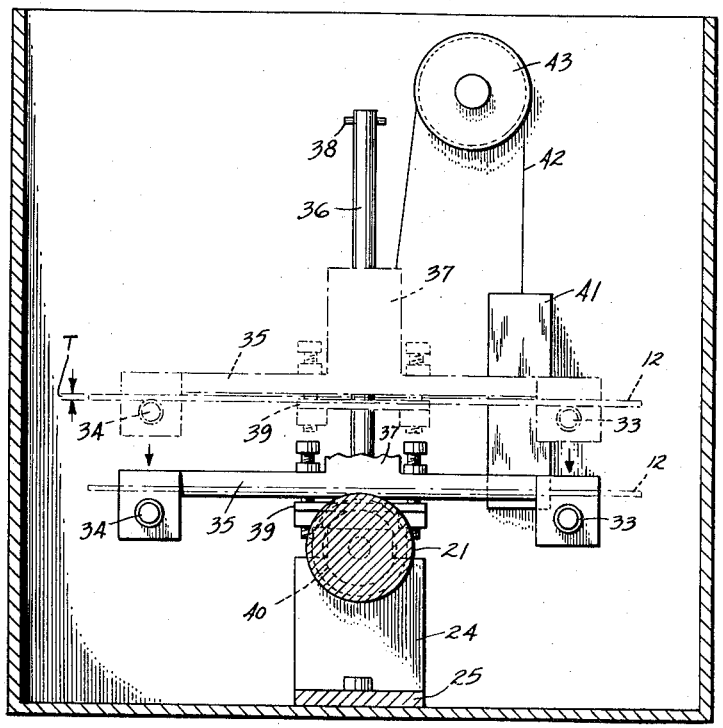
FIG. 3
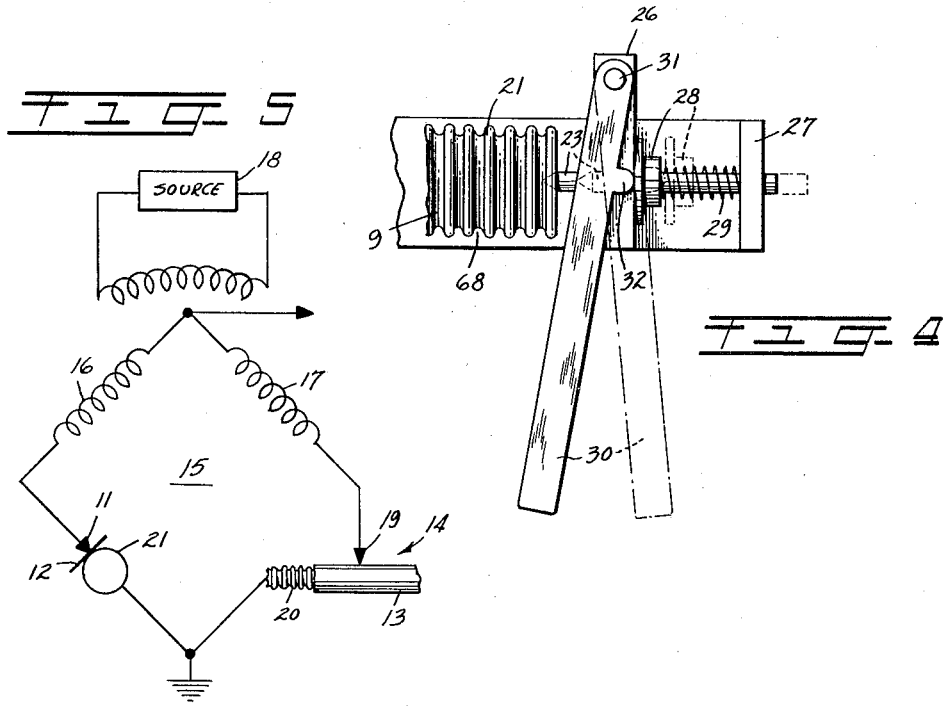
FIG. 5
FIG. 4

3,508,147
CAPACITANCE BRIDGE HAVING A REFERENCE CAPACITOR MADE FROM THE SAME MATERIAL UNDER TEST
Walter Trowbridge Eppler, Cranford, N.J., assignor to Western Electric Company, Incorporated, New York, N.Y., a corporation of New York
Filed June 11, 1968, Ser. No. 736,096
Int. Cl. G01r 27/26; B29h
U.S. Cl. 324—61                 4 Claims

ABSTRACT OF THE DISCLOSURE

A reference capacitor coupled to a capacitance bridge is used for measuring the thickness of an insulated jacket as it is being extruded onto a metallic cable sheath. The reference capacitor dielectric comprises a slab of insulation made from the same batch which constitutes a sample taken from the same production quantity of plastic material used for the jacket extrusion. The slab has a thickness specified for the jacket thickness. A conductive member of the same material and having the same peripheral shape as the cable sheath is supported in a fixture. The slab is mounted on a table in the fixture and lowered to rest on the conductive member. A probe is mounted in the fixture to make operative contact with the slab. The foregoing combination serves as the reference capacitor coupled to the bridge. The probe has the same electrical properties as a second probe in the bridge monitoring arm which second probe senses the cable jacket as it is being extruded on the cable sheath in accordance with conventional practice.

BACKGROUND OF THE INVENTION

(1) Field of invention

This invention relates to an apparatus for measuring the thickness of insulation such as the outer plastic jacket of electrical cable, and in particular, the invention relates to a reference capacitor apparatus used as one arm of a capacitance bridge circuit.

(2) Description of prior art

Reference is made to the U.S. Patent 2,721,975 issued to B. M. Wojciechowski on Oct. 25, 1955, for background information relating to the instant invention. Briefly, in the manufacture of electrical cable, the plastic jacket thickness is measured by a sensing probe in one bridge arm operatively contacting the travelling jacket following its extrusion on the cable sheath. A second bridge arm includes a fixed or variable capacitor calibrated to reflect the specified or desired jacket thickness. Accordingly, bridge balance or a signal deviation indicates, respectively, the actual desired jacket thickness or the amount of deviation from such thickness. This presupposes that the bridge capacitance measurements are predicated on a fixed dielectric constant of the material constituting the plastic jacket.

SUMMARY OF INVENTION

The cable jacket material as contemplated herein is polyvinyl chloride or polyethylene, although it should be understood that the invention is equally applicable for other plastic coating materials and to insulating materials in general. When multiple suppliers were used for such materials, it was discovered that the dielectric constant varied in accordance with the origin of the shipment. Thickness measurements may be rendered independent of dielectric constant variations if the reference capacitor is suitably calibrated for each batch of extrusion material. However, carrying out such calibrations and the adjustment of the reference capacitor in accordance therewith are extremely tedious in practice, and thus undesirable from the point of view of mass production of electrical cable.

The instant invention is designed to accommodate dielectric constant variations by forming a unique reference capacitor in one bridge arm of the circuit. The reference capacitor comprises a capactive probe electrically similar to a probe monitoring the cable jacket, a slab of insulation having a thickness equal to the thickness specified for the jacket and made of the same batch which constitutes a sample taken from the same production quantity and having the same dielectric constant of material employed for the extrusion, and a mandrel-like conductor having a peripheral outline similar to the shape of the cable sheath and made of the same material as the cable sheath. These elements are combined into a simple fixture whereby the reference capacitor probe operatively contacts the slab to simulate a probe sensing operation, and in addition, holds the slab against the surface of the conductive mandrel. Since the reference slab is made of the same batch of plastic employed for the actual jacket extrusion, thickness measurements are maintained independent of dielectric constant variations. The reference capacitor serves as an accurate reference with regard to the specified cable thickness. By using the above technique the bridge meter may be readily calibrated to read the desired thickness when the bridge circuit is in balance and thickness deviations when the bridge circuit is unbalanced. While the invention is described in terms of the thickness of a plastic sheath for a cable, it could also be used for other purposes such as for measuring the thickness of a flat sheet or layer of insulation. Since the reference capacitor elements (i.e.; the insulating slab, probe, and mandrel) are almost identical in structure to the capacitor elements of the cable being measured, high accuracy of measurement is attained.

In the broader aspects of the invention, it is not so much that the slab used in the reference capacitor according to the present invention is a sample of the identical material as the plastic material under test, but that is has substantially the same dielectric constant as such material. Saying it another way, shipments of plastic material from different suppliers could be used and tested against a reference capacitor employing a common insulating slab if the dielectric constants of the shipped material were substantially the same. The apparatus includes a pair of spaced center pins, one of which is retractable for mounting the mandrel-like conductor simulating the sheath, a vertically movable table for mounting the slab on the mandrel, and a counter-balanced pivotal arm for supporting the probe of the reference capacitor.

It is a principal object of the invention to provide an apparatus for measuring the thickness of a plastic layer by a capacitance bridge system wherein the capacitance measurements are independent of variations of the dielectric constant.

It is a further object of the invention to provide a reference capacitor in a bridge system for measuring the thickness of the plastic jacket of an electrical cable which capacitor is made up of a slab of plastic material made from the same production quantity of plastic employed for the jacket extrusion for the cable; wherein the slab is mounted on a conductive mandrel having a peripheral outline simulating the cable sheath on which the plastic is extruded; and wherein the foregoing is sensed by a probe in operative contact with the slab.

It is a further object of the invention to provide a fixture for supporting the aforementioned reference capacitor which fixture comprises center pins for holding the mandrel, a movable table for mounting the slab onto the mandrel, and a pivotal arm for supporting a sensing probe in operative contact with the slab.

Further objects and advantages will become apparent from the following description of the invention taken in conjunction with the figures in which:

FIG. 1 is a side elevational view of the housed reference capacitor in accordance with the invention;

FIG. 3 is a sectional view taken along lines 3—3 of FIG. 1;

FIG. 4 is a fragmentary view looking down along lines 4—4 of FIG. 1; and

FIG. 5 is a simplified schematic illustrating the measuring bridge employing the reference capacitor.

Figure 2:
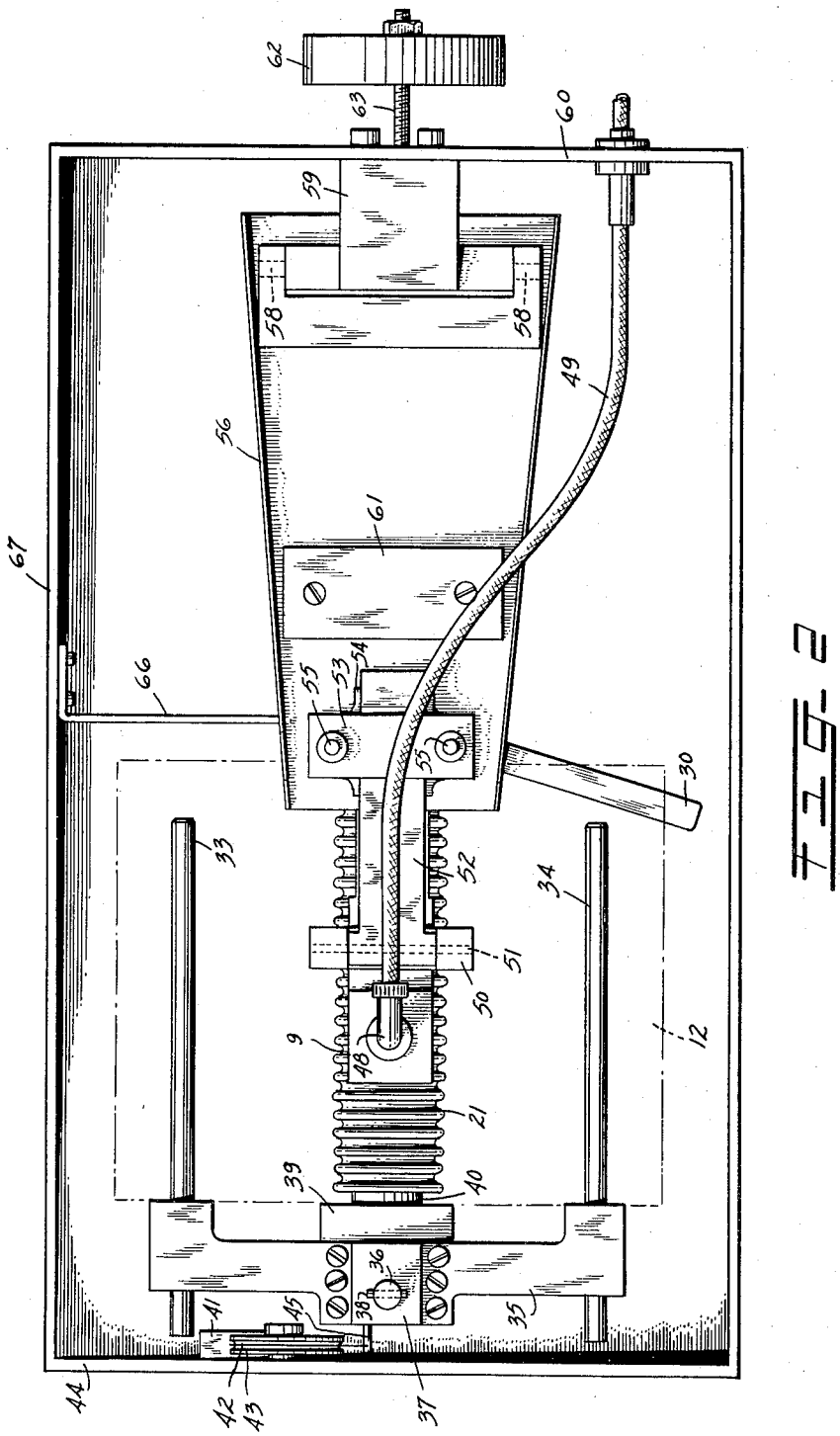
FIG. 2 is a top elevational view of the structure shown in FIG. 1.

As noted hereinbefore a metal housing 10 is designed to support a probe or electrode 11 on a flat slab 12 of plastic material made from the same production quantity of plastic employed for extruding a jacket 13 on electrical cable 14. The thickness of the slab 12 is measured with a micrometer. Incoming shipments of the plastic are checked for the value of the dielectric constant to make certain that such value is within a tolerable range for use with a particular insulating slab. The cable 14 is depicted schematically in FIG. 5. In accordance with the prior art, a bridge circuit 15 includes first and second inductive arms 16, 17 coupled to an alternating source 18, and a sensing or monitoring probe 19 as contemplated in U.S. Patent 2,721,975 or as contemplated in the U.S. patent application Ser. No. 647,745 filed June 21, 1967, in the name of W. T. Eppler. Probe 19 is supported in operative contact with the extruded jacket 13 immediately after extrusion on the cable sheath 20. The probe 19 is indexed step by step to different angular positions about the cable axis. In the illustrated example, sheath 20 is corrugated. The cable 14 and probe 19 form one arm of the monitoring bridge 15 as depicted in FIG. 5. The sheath 20 is grounded to form the grounded junction of the bridge. The opposite bridge junction feeds to an amplifier, a phase discriminator, detection and display circuit (not shown herein) in accordance with the practice of the prior art; see the aforementioned patent.

The reference arm of the bridge 15 is depicted in FIG. 5 as probe 11 in operative contact on slab 12 wherein the latter is in contact with a conductive mandrel 21 simulating a short length of a metallic cable sheath which in turn is connected to the grounded junction of the bridge. The slab 12 is formed to a thickness T equal to the thickness specified for the actual jacket 13 being extruded as an insulating layer onto the cable 14. Slab 12 rests on the cylindrical mandrel 21 made of the same conductive material, for example, aluminum, employed as the cable sheath on which the jacket is extruded. As known in the art, the cable sheath 20 is a hollow tubular member which surrounds and protects the cable core. The illustrated mandrel 21 is shown as a solid; however, it will be understood that it, too, may be a hollow tubular member. Since the sheath outer diameter contemplated herein is corrugated, the mandrel outer diameter 9 is similarly corrugated. The corrugated crown diameter of the mandrel equals the corrugated crown diameter of the sheath 20. While a corrugated sheath and corrugated mandrel have been described, the invention is equally applicable to a smooth sheath and smooth mandrel.

The mandrel 21 is supported at its ends by a pair of centering pins 22, 23, FIGS. 1 and 4. Set screws 69 hold pin 22 in a fixed position in an upright end 24 of a mandrel support 25 bolted to the floor of the fixture 10. Pin 23 is slidably mounted in bores 70 of a pair of upstanding walls 26, 27 at the other end of the support 25. A collar 28 is secured by set screws 71 to pin 23. A compressible spring 29 is mounted between collar 28 and wall 27. A handle 30 is attached to wall 26 by a pivot bolt 31. Handle 30 has a projection 32 pressing against collar 28. When the handle 30 is manually pivoted counterclockwise as viewed in FIG. 4 to its phantom position, pin 23 is retracted against the spring 29 to permit removal and replacement of the mounted mandrel 25. The force of the spring 29 returns the handle 30 and the pin 23 to its extended position illustrated in solid outline in FIG. 4 at which time the collar 28 abuts against the wall 26 which serves as a limit stop.

Slab 12 is supported horizontally on a pair of parallel spaced-apart rods 33, 34 of a vertically movable table 72. Rods 33, 34 straddle opposite sides of the mandrel 21. The forward ends of the rods 33, 34 are secured by set screws 73 to respective ends of a table yoke 35. Support 25 carries an upstanding rod 36 extending through a bore 74 in a center member 37 of yoke 35. Yoke 35 is designed to slide freely up and down on rod 36 upon manual adjustment of yoke 35. A pin 38 at the upper end of the rod acts as an upper limit stop for the yoke 35. An abutment block 39 bolted to the bottom of yoke 35 forms a protruding ledge adapted to abut against a collar-portion 40 at the end of mandrel 21 upon lowering the table yoke 35 to its lowermost position. In FIG. 3, the solid outline illustrates yoke 35 in its lowermost position with the ledge of block 39 resting against the lower limit stop collar 40 of mandrel 21. For this position of yoke 35, its attached rods 33, 34, see also the phantom outline of rod 34 in FIG. 1, are sufficiently below the upper surface of the corrugated mandrel 21 to release the slab 12, whereby slab 12 rests in operative contact on mandrel 21, and is held thereto by the probe 11 pressing down in operative contact upon the upper surface of the slab 12.

Yoke 35 and its attached rods 33, 34 remain stationary at any manually set position between its upper and lower limit stops 38, 40, by reason of a counterweight 41 held by a pulley cord 42. Cord 42 extends over a freely turning pulley 43 journalled to one end wall 44 of the fixture 10. The other end of pulley cord 42 is tied to a pin 45 extending from yoke 35.

The collar 40 on all mandrels 21 used with fixture 10 are of the same diameter to provide a fixed lower limit stop regardless of the nature or size of the cable being monitored. A set of mandrels 21 can be made for fixture 10 to match the material and shape of each of the various sheaths 20 of numerous types and sizes of monitored cable.

Probe 11 is selected to electrically match probe 19 of bridge monitoring arm. Probe 11 is carried by a carriage 46. When the carriage 46 is lowered, an insulator rest 47 bolted at the end of the carriage also contacts the slab 12. Rest 47 cooperates with the probe 11 to align the latter for proper operative contact on slab 12. Probe 11 has a connector 48 attached to a coaxial lead 49 which connects the reference capacitor to the bridge 15.

The carriage 46 includes a yoke 50 pivotally supported at 51 by an arm extension 52, the rear of which is clamped between insulator blocks 53, 54 mounted by spring-loaded bolts 55 to an arm frame 56. The end of the arm 52 has a ledge 57 which extends over the lower block 54. Arm 52 and the supported carriage 46 may be easily removed from its latched status between blocks 53, 54 to permit the replacement of a probe. A more detailed description of the attachment is set forth in the previously mentioned copending application Ser. No. 647,745. Arm frame 56 is pivotally supported at 58 by bracket means 59 secured to a fixture wall 60. A weight 61 is bolted to arm frame 56 to provide a desired probe contact pressure on slab 12. The entire probe assembly including its arm frame is counterbalanced by a weight 62 threadedly secured to a rod 63 extending through an opening 64 in the fixture wall 60 and attached to a block 65 at the end of the frame 56. Adjustment of the weight 62 provides the desired probe contact pressure on the slab. A leaf spring bracket 66 is bolted to a side fixture wall 67 and serves to hold the probe assembly in raised position as shown in solid outline in FIG. 1.

The solid outline in FIG. 1 depicts the yoke rods 33, 34 in raised position at which time one slab may be replaced by another. Upon lowering the yoke 35, the slab 12 is mounted on the mandrel 21. For convenience, the slab 12 may be held manually until the probe assembly is lifted off its bracket rest 66 and lowered until the probe 11 in cooperation with insulator contact 47, rest upon and hold the slab 12 in contact position on the mandrel 21. The latter arrangement is depicted in phantom in FIG. 1.

A cover (not shown) may be used to enclose the top of the fixture 10. A conductive lead (not shown) extends into the fixture and grounds same and the mandrel to provide the AC ground at the bridge junction. The fixture components are preferably made of any convenient conductive material or metal and is grounded. The fixture walls are grounded to serve as an electrical shield.

The troughs of the cable sheath corrugations are filled with extrusion. The corresponding trough spaces 68 in mandrel 21 are filled with air in the reference capacitor as depicted in FIG. 1. The error introduced thereby is a constant but nominal value and does not interfere with the bridge thickness measurements. If necessary, the underneath surface of the slab may be formed with mating corrugations to simulate more accurately the cable structure although, as pointed out, this is not deemed necessary. As a matter of fact, an insulating layer of the proper dielectric constant and thickness could be extruded directly on a solid or tubular mandrel having a corrugated or smooth surface.

It is intended that all matter contained in the above description and shown in the accompanying figures shall be interpreted as illustrative and not in any limiting sense.

What is claimed is:

1. In a capacitance bridge for monitoring a workpiece, and in particular, the thickness of an insulator covering a conductive member, wherein a first capacitance probe operatively contacts the insulator and cooperates with the underneath member to form a bridge monitoring arm, the combination comprising:
   a second probe electrically similar to said first probe;
   a slab of insulator material having a thickness correlated to the thickness specified for the insulator and made from the same production quantity of material as the material constituting the insulator so that said slab has the same dielectric constant as the insulator;
   a second conductive member having the same peripheral shape and made of the same material as the first member, said slab being supported on said second member for simulating the monitor workpiece, and said second probe operatively contacting said slab and cooperating with said second member to form a second bridge arm serving as a reference capacitor;
   means including a pair of centering pins for supporting said second conductive member, one of said pins being retractable for allowing removal and replacement of said conductive member;
   movable means for holding said slab over said second conductive member and then releasing said slab to rest on said second member; and
   pivotal means for supporting said second probe and movable to a position for causing said probe to make operative contact with said slab.

2. The combination as defined in claim 1 wherein said movable means comprising:
   a yoke having a pair of parallel spaced-apart rods straddling said second conductive member, said rods serving as a table for carrying said slab,
   a rod supported in said fixture,
   said yoke being slidably mounted on rod for movement toward and away from said second conductive member, and
   counterweight means connected to said yoke for holding same in a manually set position above said second conductive member.

3. A reference capacitive apparatus employed as a reference arm in a capacitive bridge system for monitoring the thickness of an insulating jacket as the insulating jacket is being extruded onto a first conductive tube maintained at substantially ground potential wherein a monitoring arm of the capacitive bridge system includes a first capacitive probe, in operative contact with said insulating jacket, to measure the capacitance across the jacket, said reference capacitive apparatus comprising:
   a second conductive tube maintained at substantially ground potential, said second conductive tube having the same peripheral shape and being made from the same material as the first conductive tube;
   a slab of material having a dielectric constant and thickness substantially equal to the dielectric constant and desired thickness of the insulating jacket and made from the same production quantity as said insulating jacket;
   means for holding said slab in operative contact with said second conductive tube; and
   a second capacitive probe in operative contact with said slab to measure the capacitance across said slab so that when the capacitance of said insulating jacket and said slab are identical, the capacitive bridge system balances to monitor the thickness of said insulating jacket.

4. A reference capacitive apparatus according to claim 3 wherein said second capacitive probe is electrically similar to said first capacitive probe.

References Cited

UNITED STATES PATENTS 2,721,975 10/1955 Wojciechowski _____ 324—61
2,765,441 10/1956 Gambrill.
2,800,590 7/1957 Gilman.

EDWARD E. KUBASIEWICZ, Primary Examiner

U.S. Cl. X.R.

18—2